Jan. 16, 1934.  G. R. BINAU  1,943,284
CORN PICKER AND MEANS FOR ATTACHING THE SAME TO A TRACTOR
Original Filed Jan. 19, 1931  5 Sheets-Sheet 1
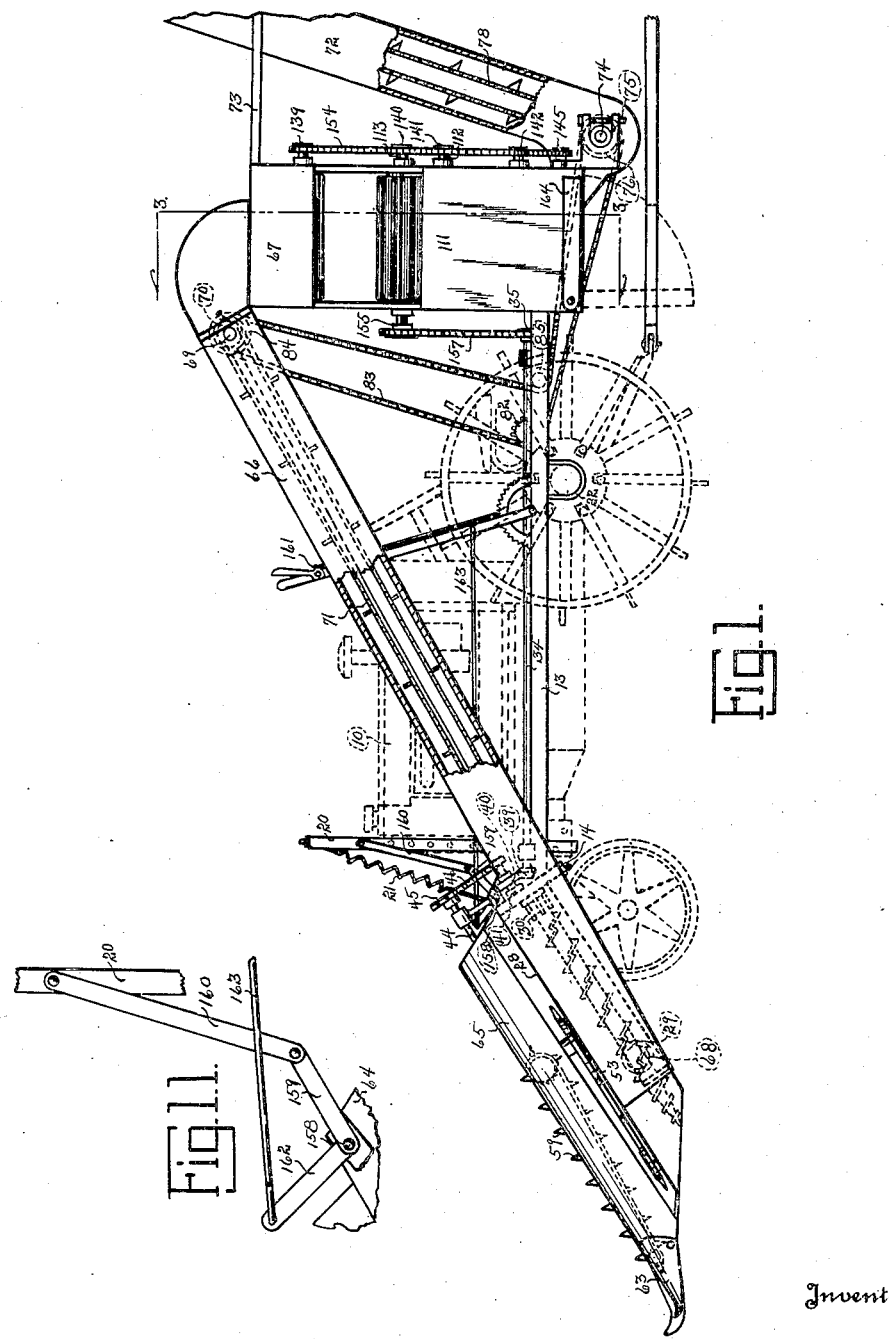
Inventor
G. R. BINAU
By M. Talbert Dick
Attorney

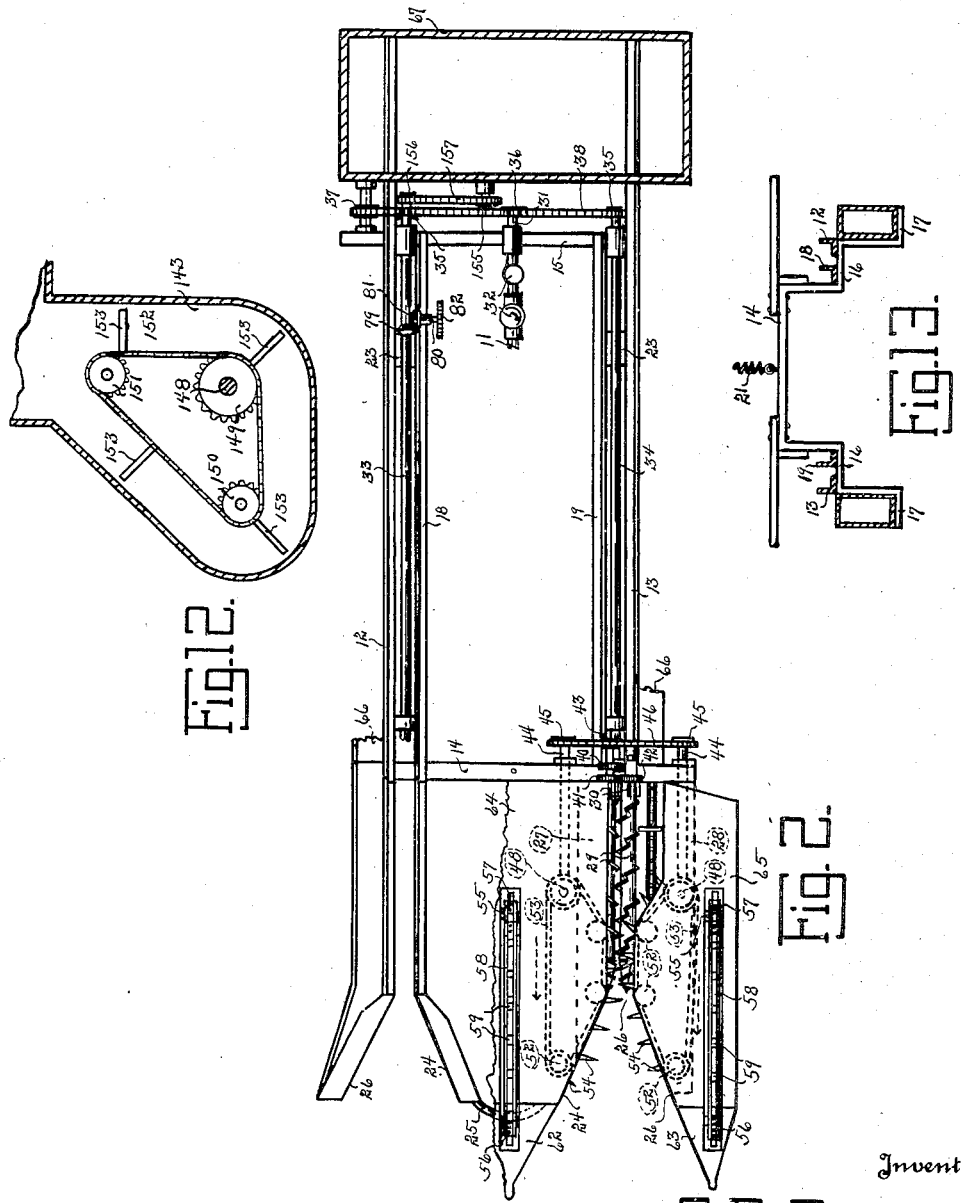

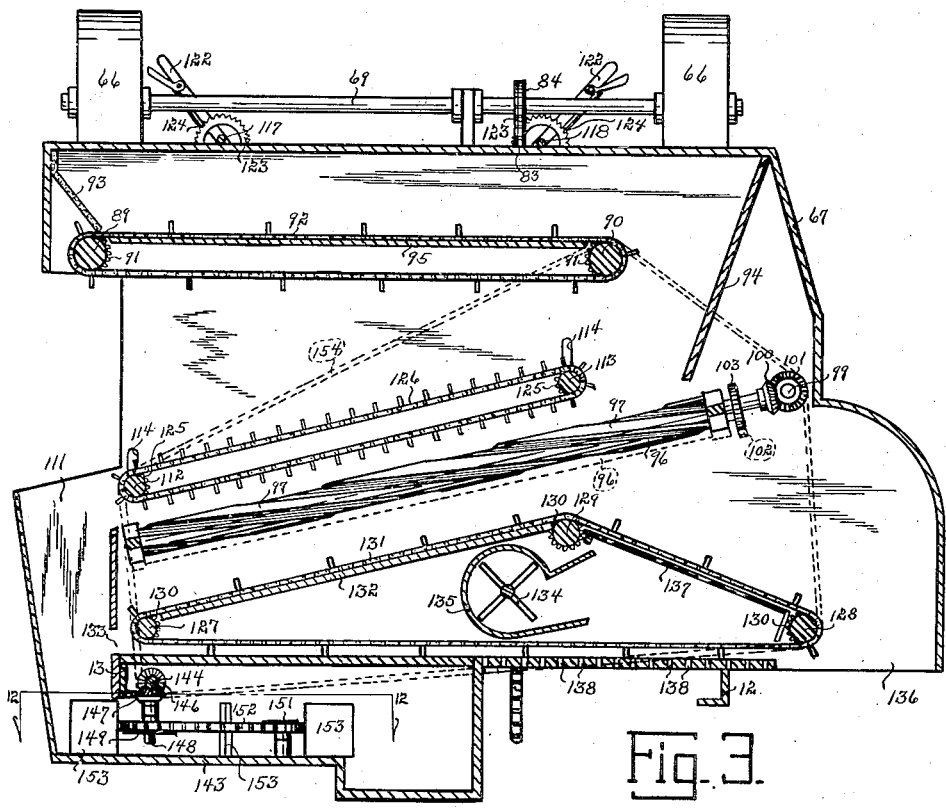
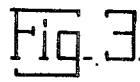
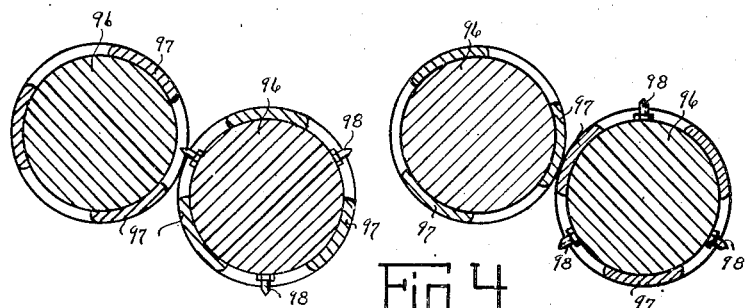
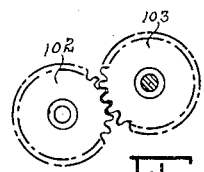

Jan. 16, 1934.  G. R. BINAU  1,943,284
CORN PICKER AND MEANS FOR ATTACHING THE SAME TO A TRACTOR
Original Filed Jan. 19, 1931   5 Sheets-Sheet 4

Inventor
G. R. Binau
By M. Talbert Dick
Attorney

Patented Jan. 16, 1934

1,943,284

UNITED STATES PATENT OFFICE 1,943,284

CORN PICKER AND MEANS FOR ATTACHING THE SAME TO A TRACTOR

George R. Binau, Allerton, Iowa

Application January 19, 1931, Serial No. 509,607
Renewed May 12, 1933

8 Claims. (Cl. 56—18)

The principal object of my invention is to provide a corn picker that not only removes the ears from standing-stalks, but lifts the down-stalks to a position where their ears are also gathered, thereby successfully and cleanly snapping and husking the field of all grain.

A further object of this invention is to provide a corn picker that leaves the picked field of corn in a relatively good condition.

A still further object of my invention is to provide a motorized corn snapping and husking implement that has its center of resistance directly forward of its center of thrust, thereby eliminating any side drag.

A still further object of my invention is to provide a corn picker and husker of rigid frame construction and one that may be easily attached to or detached from an automotive vehicle such as a tractor.

A still further object of my invention is to provide a corn picker that will yieldably conform to the contour of the ground over which it passes, thereby assuring its close proximity to the ground at all times for engaging and contacting any and all cornstalks.

A still further object of this invention is to provide a corn picking implement that may be easily and quickly adjusted by the operator to compensate for corn husks of varying moisture content, thereby assuring the successful husking of all ears under either dry or wet conditions.

A still further object of this invention is to provide a corn picker that not only successfully husks all ears of corn passing through it, but saves all grain accidentally shelled from the ear during the husking process.

A still further object of my invention is to provide a motorized corn snapping and husking machine that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side sectional view of the main portion of my invention installed on and to a tractor, positioned and illustrated by dotted lines.

Fig. 2 is a top plan sectional view of my complete invention detached from a tractor or like.

Fig. 3 is an enlarged cross sectional view of the invention taken on line 3—3 of Fig. 1 and more fully illustrates the husking mechanism of the invention.

Fig. 4 is a cross sectional view of four of the husking rolls used in the invention.

Fig. 5 is an end view of the spur wheels used to operatively connect each of the higher positioned husking rolls with a lower positioned husking roll.

Fig. 11 is an enlarged view of the means for manually lifting and adjusting the front end portion of the invention relative to the tractor to which it is attached.

Fig. 12 is a top plan view of the method of delivering the husked corn to the conveying elevator of the invention.

Fig. 13 is a rear view of the frame base located in the front end portion of the corn picker.

Figure 6:
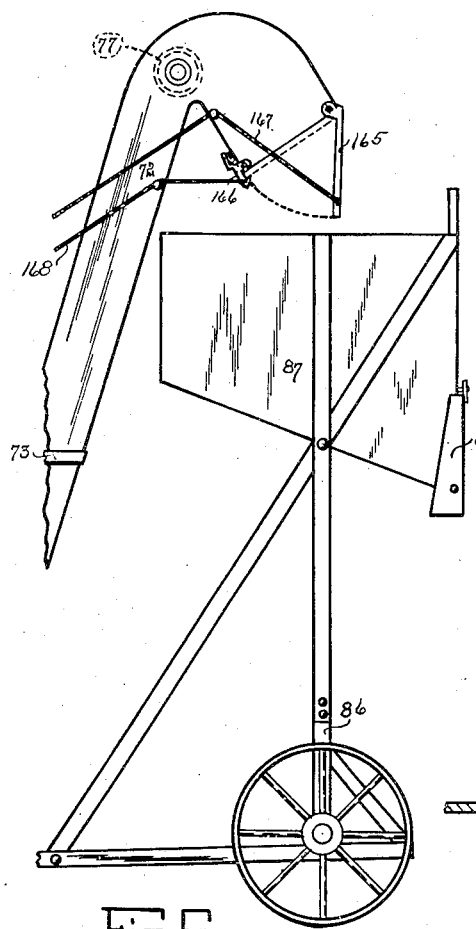
Fig. 6 is a side view of the rear end portion of the invention that was not shown in Fig. 1.

One of the most disagreeable tasks in farming is the manual snapping and husking of corn. Also, such hand gathering of corn necessitates a long period of time, during which time, much of the grain may be lost by the effect of the elements or scavengers. If the field of corn is a very large one, the time taken to husk the same may be of such length that winter snows will cover the field and the corn will then not be able to be picked until after the spring thaws. To solve these problems, many machines have been invented and built which cover the field quite rapidly, but fail to pick up down-stalks of corn or pick the field cleanly, thereby necessitating the second consideration of the field by manually picking the many ears of corn not gathered by the machine. I have overcome these objections, as will be appreciated by those familiar with corn picking machines.

I have used the numeral 10 to designate an ordinary tractor or automotive vehicle to which my invention is attached. All such farm tractors have a standard power take-off shaft 11, having its forward end operatively connected to the crank shaft of the engine of the tractor. It is to this tractor 10 and power take-off shaft 11 that I attach my invention and which I will now explain.

The two outer frame beams of the invention I have designated by the numerals 12 and 13, as shown in Fig. 2, and are in the form of angle irons. These two beams are rigidly spaced and held apart by two cross beams 14 and 15. It will be noted in Fig. 13, that the cross beam 14 extends downwardly at each of its end portions in the form of two steps, which are designated by the numerals 16 and 17. It is on the two steps 16 that the longitudinal beams 12 and 13 are secured respectively and are located near the outer portions of the steps 16, as shown in Fig. 13.

The numerals 18 and 19 designate two additional longitudinal beams on the inside of and spaced apart from the two beams 12 and 13, as shown in Fig. 2. These beams 18 and 19 extend as far forwardly as the beams 12 and 13, but have rear ends secured to and terminating at the points where they are rigidly secured to the cross member 15. These beams 18 and 19 are also secured to the cross member 14 and on the steps 16, as are the beams 12 and 13, but their positions on the steps 16 are spaced apart and inwardly from the beams 12 and 13, as shown in Fig. 13. The above designated parts comprise the main framework of my invention and this framework when installed on a tractor, embraces the same. To secure the device to a tractor, I provide a circular arch 20 secured at its two ends by suitable means to the two front sides of the tractor 10. This arch 20 extends a considerable distance above the top plane of the tractor. The numeral 21 designates a coil spring having one end secured to the top of the arch 20 and its other end secured to the central portion of the cross member 14. The rear end portion of the main frame is rotatably supported by loop members 22 which loosely embrace the axle housing. These loop members are secured by any suitable means to the brace members 23 which are in turn fastened to the longitudinal bar members that make up the frame of the invention. By such a construction the forward end portion of the frame may move upwardly or downwardly and is only yieldingly held from doing so by the spring 21.

As shown in the drawings, after the longitudinal beam members 12, 13, 18 and 19 cross the cross member 14, they extend forwardly and downwardly. Secured on the forward end of each of the beam members 18 and 19 is a cornstalk engaging and guiding members 24. These two members 24 extend forwardly and inwardly and terminate a short distance from each other. They are rigidly held together by a connecting member 25. The numeral 26 designates similar cornstalk engaging and guiding members, but secured to each of the beams 12 and 13 and extending forwardly and outwardly, as shown in Fig. 2. By this arrangement, the basis of a two-row corn picker is provided. The numeral 27 designates a supporting board secured to each of the members 24 and extending rearwardly to a point where they are secured to the member 14. The numeral 28 designates a somewhat similar supporting board mounted on and above each of the members 26 and the beam to which that member is secured. The cornstalks that are engaged by the members 24 and 26 are guided into the spaces between the members 12 and 18 and the members 19 and 13. Rotatably mounted in each of these provided spaces and extending forwardly and downwardly, as shown in Fig. 1, are a pair of snapping rolls 29 pointed at their forward ends. These two pairs of snapping rolls are of the usual construction well known in corn pickers, except at their rear ends I have provided longitudinal radially extending ridges 30. These ridges or teeth assure the final and successful snapping any ear from a cornstalk that has progressed to the rear ends of the snapping rolls without being removed from the cornstalk.

Assuming that my device has been attached to a tractor, the power take-off shaft 11 of the tractor is operatively connected by any suitable means to the shaft 31 rotatably mounted on the cross member 15. In order to permit the up and down movement of the rear end of the invention on the tractor without affecting this transfer of power from the tractor, universal joints 32 are used. Rotatably mounted in the space between the members 12 and 18 and to the rear of the cross member 14 is a drive shaft 33. A similar drive shaft 34 is rotatably mounted in the space between the beams 19 and 13. Rigidly secured on the rear ends of the shafts 33 and 34 is a sprocket wheel 35. The numeral 36 designates a sprocket wheel rigidly secured on the rear end of the shaft 31. The numeral 37 designates an idler sprocket wheel rotatably mounted to the right of the sprocket wheel on the shaft 33. The numeral 38 designates an endless chain embracing the sprocket wheel 35 on the shaft 34 and embracing the idler sprocket gear 37. This chain also has its lower portion engaging the underside of the sprocket gear 36 and by the use of the idler 37 its under portion engages the upper side of the sprocket gear 35 on the shaft 33. This means that when the shaft 31 is rotating to the right, the shaft 34 will be rotating to the right also, but the shaft 33 will be rotating to the left. On the forward end of each of the driving shafts 33 and 34 is a bevel gear 39. As the two pairs of snapping rolls are forward the ends of the two driving shafts 33 and 34 respectively, these bevel gears 39 will be adjacent the rear ends of the two pairs of snapping rolls. As shown in the drawings, the inner snapping roll of each pair of snapping rolls is slightly higher in elevation than the elevation of the outer snapping roll.

The numeral 40 designates a toothed gear on the rear end of each of the inner snapping rolls in engagement with the two bevel gears 39 respectively. By this arrangement of gears, each of the inner snapping rolls will rotate outwardly when the shaft 31 is rotated. The numeral 41 designates a second spur gear rigidly secured on the rear end of each of the inner snapping rolls. The numeral 42 designates a like spur gear rigidly secured to each of the outer snapping rolls and in engagement with the spur gear 41 adjacent to it. By thus connecting each pair of snapping rolls to each other, they will rotate toward each other when the shaft 31 is rotated by the prime mover.

Figure 9:
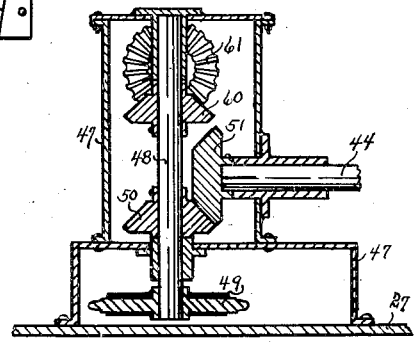
Fig. 9 is an enlarged side view of the gears for operatively connecting one of the lug pick-up chains that extends at an angle to the horizontal.

Also rigidly secured on the rear end of each of the inner snapping rolls is a spur gear 43. The numeral 44 designates two rotatably mounted short shafts on each side of each pair of picking rolls respectively. On the rear end of each of these shafts 44 is a sprocket gear 45. Embracing each group of spur gears 43 and sprocket gears 45 is an endless chain 46 for rotating both of the shafts 44 in the same direction of rotation as the direction of rotation of the inner snapping roll to which they are located at each side. At the forward end of each of the shafts 44 is a bracket member 47, as shown in Fig. 9, designed to rotatably support a transversely arranged shaft 48. Secured against independent rotation on the lower end of each of the shafts 48 is a sprocket gear 49. The numeral 50 designates a bevel gear secured by suitable means to each of the shafts 48. Each of these bevel gears 50 is in engagement with a similar bevel gear 51 secured on the forward end of one of the shafts 44. The numeral 52 designates a plurality of spaced apart sprocket idler gears rotatably mounted on each of the supporting boards 27 and 28. These idler gears extend and are located near the inner marginal edges of the supporting boards 27 and 28, as shown in Fig. 2.

The numeral 53 designates an endless chain embracing each of the four groups of sprocket idler gears 52 and sprocket gear 49. Secured to each of these chains 53 are engaging lugs 54. These chains 53, with their lugs, provide the cornstalk engaging and guiding means that extends forwardly and downwardly at an angle to the horizontal. As each pair of chains 53 is located at the two sides of each pair of snapping rolls 29 they must travel in opposite directions from each other, as shown by arrows in Fig. 2. To accomplish this, it is merely necessary to have one of the bevel gears 50 engaging the lower portion of one of the bevel gears 51 and the other bevel gear 50 inverted on the shaft 48 to engage the upper portion of the other bevel gear 51.

Figure 10:
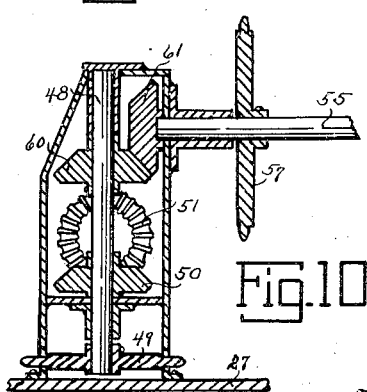
Fig. 10 is a front end view of the gears used to operatively connect one of the lug pick-up chains of the invention that travels at an angle to the vertical.

Extending and rotatably mounted between the two brackets 47 located between the beams 18 and 19 is a shaft 55. The numeral 56 designates a sprocket idler gear rotatably mounted on the member 25. Rigidly secured against independent rotation on the shaft 55 is a sprocket gear 57. The numeral 58 designates an endless chain embracing the sprocket gears 56 and 57 and having the engaging lugs 59. Rigidly secured on the shaft 48 located to the left of the sprocket gear 57 is a bevel gear 60. This bevel gear 60 is in engagement with the bevel gear 61 rigidly secured to the shaft 55, as shown in Fig. 10. By this construction the central cornstalk engaging and guiding chain is provided, as shown in Fig. 2, which extends forwardly and downwardly at an angle to the vertical. At each side of each pair of snapping rolls is an exact duplicate of the chain 58. These side chains are similarly positioned, mounted, and operatively connected to the outer positioned shafts 48. In this connection all similar parts bear the same reference numeral.

The numeral 62 designates a pointed shoe pivotally secured on the forward ends of the engaging and guiding members 24. Similar members designated by the numeral 63 are pivoted to the forward ends of the members 26. The numeral 64 designates a curved shield extending between the forward end portions of the beams 18 and 19 and the cross beam 14 and shoe 62, as shown in Fig. 2. A cut-away portion is formed in this shield to permit the upper portion of the chain 58 with its lugs to extend therethrough, as shown in the drawings. A curved shield member 65 is secured to each of the outside beams and members 26. These side shields 65 extend forwardly to the shoes 63 and also have a longitudinal slot to permit the side chains and lugs 59 to extend through. They each have their inner rear side portions broken away to permit the ears snapped by the snapping rolls to move outwardly from each pair of snapping rolls and fall into the elongated elevator housing 66 located at each side of the invention, as shown in the drawings. These two side elevator housings are to the side of each pair of snapping rolls respectively and extend rearwardly and upwardly to points where they empty into the shucking mechanism housing 67, as shown in Fig. 3. In the lower ends of each of these elongated housings 66 is rotatably mounted a sprocket gear 68.

Rotatably mounted in the upper end portions of the housings 66 is a common shaft 69. Inside each of the elongated housings 66 is a sprocket gear 70 rigidly secured against independent rotation on the common shaft 69. The numeral 71 designates the usual endless chain conveyor embracing the sprocket gears 68 and 70 in each of the housings 66. The numeral 72 designates a single elevator housing hinged at its lower end to the lower end of the housing 67 and communicating with the bottom of the same.

This housing 72 extends upwardly and rearwardly and due to its pivot support may move toward the housing 67 or away from the housing 67. Its movement away from the housing 67 however, is limited by a bracket 73, which engages the rear side of the same, as shown in Fig. 6. Rotatably mounted in the lower end of the conveyor housing 72 is a shaft 74 carrying the two sprocket gears 75 and 76. Rotatably mounted in the upper end portion of the conveyor housing 72 is a sprocket gear 77. The numeral 78 designates an endless bucket conveyor chain embracing the sprocket gears 75 and 77. The numeral 79 designates a bevel gear on the shaft 33. The numeral 80 designates a shaft rotatably mounted on the beam 18 having a bevel gear 81 in engagement with the bevel gear 79. Also secured to the shaft 80 is a sprocket gear 82. The numeral 83 designates an endless chain embracing a sprocket gear 84 on the shaft 69, the sprocket gear 76 on the shaft 74 engaging the sprocket gear 82, and an idler sprocket gear 85, as shown in Fig. 1. By this arrangement, all of the snapped ears from the snapping rolls will be carried by the conveyor chains 71 and deposited in the top of the shucking mechanism housing 67, and the shucked ears and grain from this housing will be carried from the bottom thereof upwardly, by virtue of the bucket conveyor chain 78 and dumped out of the upper end of the housing 72. If it is desired, this shucked grain may be deposited from the housing 72 directly into a receiving wagon. However, in the drawings I show a wheeled trailer 86, secured by suitable means to the tractor and carrying a shucked grain receiving tank 87, as shown in Fig. 6. This tank 87 may have a door 88 for removing grain therefrom, which is located in the rear lower side. To facilitate the removal of this grain from the tank 87, the bottom of the tank should be sloped downwardly and rearwardly, as shown in the drawings.

Figure 7:
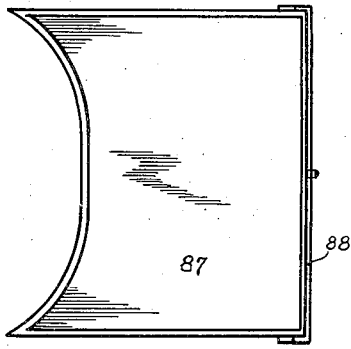
Fig. 7 is a plan view of the husked corn collecting tank.

In order that the upper and open end of the housing 72 will be in close proximity to the tank 87 at all times and especially when the device is turning a corner, I have made the forward side wall of the tank 87 in concave form, as shown in Fig. 7.

The numerals 89 and 90 designate two spaced apart horizontally rotatably mounted shafts in the upper portion of the housing 67, as shown in Fig. 3. On each of these shafts are the usual sprocket gears 91. Embracing the two shafts 89 and 90 and the sprocket gears 91 is the endless chain conveyor 92. These shafts 89 and 90 are so positioned that the conveyor 92, which extends completely across the length of the housing 67 will extend from a point below the left conveyor housing 66 to a point to the left of the open end of the right side conveyor housing 66. The numeral 93 designates a flexible baffle member for guiding the corn from the left conveyor housing 66 to and onto the conveyor chain 92. This conveyor chain 92 acts as a vehicle when rotating to the right to move all of the ears of corn to the right upper portion of the housing 67, as shown in Fig. 3. From this point, the ears of corn from the conveyor 92 and the ears of corn from the right conveyor 66 will fall to and onto the upper end portions of the husking rolls. This action is also aided by the downwardly and inwardly extending baffle member 94. To prevent any shelled grain being deposited with the ears onto the conveyor 92, from falling through the conveyor 92, I have provided an impervious flat member 95 below the upper portion of the conveyor 92. The numeral 96 designates a plurality of rotatably mounted husking rolls extending from the right side of the housing 67 to the left and downwardly, as shown in Fig. 3.

These husking rolls are arranged in pairs, as shown in Fig. 4 and each of the two rolls that make up a pair are designed to rotate toward each other, or toward the ears of corn being husked between them. Each of these husking rolls has a plurality of peripheral spiraling projections 97, as shown in the drawings and one of each pair of rolls is positioned at a slightly higher elevation than its mate. The numeral 98 designates husking pegs secured to each lower roll of each pair and these husking pegs are located between the spiraled projections 97, as shown in Fig. 4. The numeral 99 designates a shaft rotatably mounted in the housing 67 and in close proximity to the upper ends of the husking rolls 96. The upper husking roll of each pair of husking rolls is operatively connected to this shaft 99 by having a bevel gear 100 in engagement with a bevel gear 101 rigidly secured on the shaft 99. Each pair of husking rolls is operatively connected to each other by a spur gear 102 rigidly secured to the upper roll being in engagement with the spur gear 103 rigidly secured to the lower roll.

The numeral 140 designates a sprocket gear rigidly secured to the shaft 99 and outside of the housing 67. This sprocket gear is contacted by the endless chain 154, as shown in Fig. 1.

Figure 14:
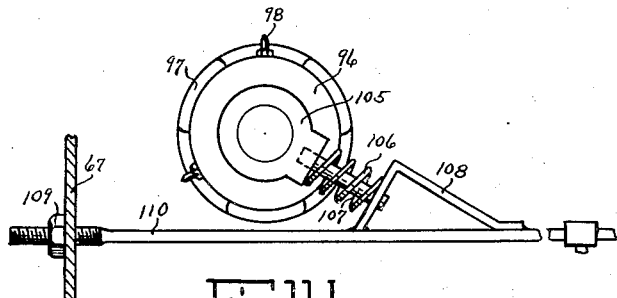
Fig. 14 is an end view of a yieldingly mounted husking roll.
Figure 16:
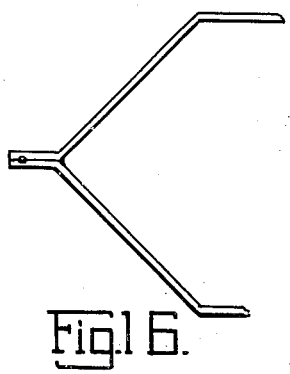
Fig. 16 is the tongue portion of the trailer.
Figure 15:
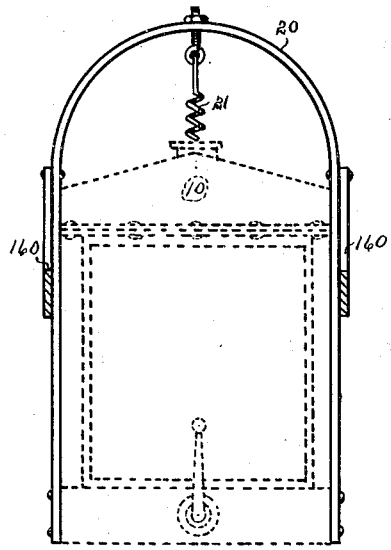
Fig. 15 is a front view of the arch secured to the tractor.
Figure 17:
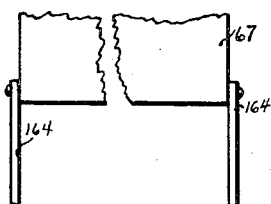
Fig. 17 is a rear view of the hinged supporting legs.

As is well known in the art, each of the two husking rolls that make up a pair are yieldingly held in close proximity to each other. Any well known method desired may be used. In Fig. 14, I show one way of accomplishing this result, which consists of the bearing members 105 of each of the lower rolls being yieldilngly held by a spring 106 toward the upper roll adjacent to it. This spring 106 may embrace a rod 107, which has one end engaging the bearing and its other end portion slidably mounted in a bracket 108.

Figure 8:
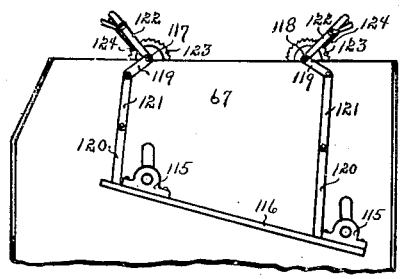
Fig. 8 is a cross sectional view of the adjustable metal endless raddle used in the invention for properly and yieldingly holding the ears of corn to the husking rolls and also aiding the corn to pass from the husking rolls.

With one end of the coil spring engaging the bearing member 105 and its other end engaging the bracket 108, the tendency will be for this spring to yieldingly hold the husking roll toward its mate. By adjusting the nut 109 on the bar 110 slidably mounted in the housing 67, various tensions of the spring 106 may be experienced. By slidably mounting and placing the bar 110, having brackets 108 and nut 109, transversely under each end of the husking rolls, all of the lower husking rolls may be uniformly adjusted for any tension by the mere rotating of only two nuts 109. As the ears engage the husking rolls 96, they will work to the left and downwardly on the same, during which period they will have their husks removed by the husking rolls, as we have herebefore explained. From the husking rolls 96, the husked ears of corn will fall into the chute 111 in the left side of the housing 67. The numerals 112 and 113 designate two spaced apart shafts extending completely through the housing 67 from its forward end to its rear end, by virtue of vertical slots 114, as shown in Fig. 8. These slots are so positioned in the two ends of the housing 67 that the shafts 112 and 113 will be each positioned approximately equal distance above the husking rolls 96, as shown in Fig. 3. The two forward ends of these two shafts are rotatably mounted in bearing members 115, which are secured to a common bar 116. Likewise, the two rear ends of these two shafts are rotatably mounted in bearing members, which are secured to a bar which is an exact duplicate of the bar 116. Rotatably mounted on top of the housing 67, spaced apart, and parallel with the shafts 112 and 113, are the two shafts 117 and 118. Rigidly secured on each end of the shafts 117 and 118 is an arm 119. Secured to each of the bars carrying the bearing members are two spaced apart upwardly extending arms 120.

The numeral 121 designates a link connecting each of the arms 119 to one of the arms 120, as shown in Fig. 8. By this arrangement, if either of the shafts 117 or 118 are rotated, the shafts 112 or 113 will be lowered or raised. To facilitate the manual rotation of these shafts 117 and 118, I have provided hand levers 122, which are rigidly secured to the shafts respectively. These hand levers may be locked in any position of their movement by the well known circular rack 123 being engaged by their catch members 124. By this arrangement, the extreme downward movement of the shafts 112 and 113 may be adjustably limited. The numeral 125 designates sprocket gears on each of the shafts 112 and 113. Embracing these shafts and engaging the sprocket wheels 125 is the endless raddle 126, as shown in Fig. 3. The weight of this raddle yieldingly engages the ears of corn and yieldingly holds them in proper contact with the husking rolls 96. Also, by the rotating of this endless raddle to the right, the ears of corn will be encouraged to move downwardly and to the left on the husking rolls until they eventually drop into the chute 111 in shucked condition. By providing the links 121, this endless raddle may move upwardly to permit the passage of extraordinary obstructions between it and the top of the husking rolls.

The numerals 127 and 128 designate two shafts spaced apart and rotatably mounted in the housing 67. These two shafts are in the same level plane with each other and are located below the snapping rolls 96, as shown in Fig. 3. The numeral 129 designates a third shaft rotatably mounted in the housing 67, but at a greater elevation than the elevation of the shafts 127 and 128. Inside the housing 67 and on each of the shafts 127, 128, and 129, are the usual sprocket gears 130.

Embracing these three shafts and the sprocket gears 130 is an endless perforated conveyor 131. Under the upper portion of this perforated conveyor that extends between the shaft 127 and the shaft 129 is an imperforate board 132. By this construction, when the conveyor 131 is rotated to the right, all of the shelled grain and husks passing between the husking rolls 96 will fall onto this conveyor, which is slowly moving to the right. By virtue of the board 132, the shelled grain will be prevented from dropping through the conveyor at any point between the shafts 127 and 129, but may drop easily through the conveyor at any point between the shafts 129 and 128. This shelled grain will eventually reach the bottom of the housing 67, which is being contacted by the lower portion of the conveyor 131. As the conveyor is rotating to the right, it will eventually transfer this shelled grain into the chute 111 through the opening 133. In order to deliver only clean shelled grain to the chute 111, I have provided a centrifugal fan 134 located between the upper and lower portions of the conveyor 131 and inside a fan housing 135 with its open end extending toward the portion of the conveyor 131 that extends between the shafts 117 and 118. With this fan 134 rotating to the left, a blast of air will remove all light material such as dirt and the like from the shelled grain as it falls to the floor of the housing 67. This blast of air will also pass through the conveyor 131 between the shafts 129 and 128 and will blow all silks, husks, dirt, and the like from the top of this portion of the conveyor out and through the opening 136 in the bottom of the housing 67. As an aid to prevent any excess amount of husks or silks passing through the conveyor 131 between the shafts 129 and 128, I have provided a plurality of spaced apart bars 137.

If any fine undesirable material is still mixed with the shelled grain when it reaches the floor of the housing 67, I have provided small passageways 138 in the bottom of the housing 67 for the passage and loss of such material. The numeral 139 designates a sprocket gear rigidly secured on the shaft 90. The numeral 140 designates a sprocket gear rigidly secured to the rear end of the shaft 99. The numeral 141 designates a sprocket gear rigidly secured to the shaft 112. The numeral 142 designates a sprocket gear rigidly secured to the shaft 128.

The numeral 143 designates an auxiliary bottom formed on the bottom of the housing 67, which completes the lower end portion of the housing 67 and communicates with the inside of the conveyor housing 72. Rotatably mounted in the rear end of the housing 67 and extending into the auxiliary bottom is the shaft 144. On the outer end of this shaft is a sprocket gear 145 and on the forward end of the shaft 144 is the bevel gear 146. This bevel gear 146 is in engagement with a second bevel gear 147, which is secured to the vertical rotatably mounted shaft 148. Also secured to the shaft 148 is a horizontal sprocket gear 149. The numerals 150 and 151 designate two idler sprocket gears in the same plane as the sprocket gear 149 and also rotatably mounted in the auxiliary bottom of the housing 67, as shown in Fig. 12. Embracing these three sprocket gears is an endless chain 152 carrying paddle vanes 153. By this arrangement, when the shaft 144 is rotated the paddles 153 will engage and move all material from the chute 111 to the bottom of the elevator housing 72 where it is contacted by the bucket chain 78. The numeral 154 designates an endless chain embracing the sprocket gears 139, 140, 141, 142, and 145. This chain may be held in a taut condition by an adjustable compensating idler gear, well known in the art.

The numeral 155 designates a sprocket gear rigidly secured on the shaft of the centrifugal fan 134. The numeral 156 designates a sprocket gear rigidly secured on the extreme rear end of the shaft 33. These two sprocket gears are embraced by the endless chain 157.

By the above description of the invention it will readily be seen that the center of resistance of my corn picker will be in a direct line with the forward thrust of the tractor and that no drag to either side of the prime mover will be experienced. By placing the pivot point of the invention at the hind wheels of the tractor, the forward engaging end portion that contacts the corn to be picked may move upwardly or downwardly to conform to the curvature of the ground over which the device is traveling. Also, this floating action of the corn snapping mechanism permits vertical movements to compensate for other various resistances experienced by the invention during the corn snapping operation and makes it possible for the pointed shoes 62 and 63 to follow the ground very closely, thereby raising down stalks to a position where they are readily contacted by the lug chains 53 and 58. To adjustably limit the downward movement of the forward end of the invention below a predetermined elevation, I have provided a manually operated means, which I will now describe.

The numeral 158 designates a shaft rotatably mounted to the cross member 14 and extending parallel with the same. The numeral 159 designates two arms spaced apart and rigidly secured at their lower ends to the shaft 158. The numeral 160 designates two links hingedly secured at their upper ends to each side of the arch 20 respectively, and their two lower ends pivotally secured to the two arms 159 respectively.

Secured on the frame 13 is the usual manually operated ratchet lever 161, as shown in Fig. 1. The numeral 162 designates a third arm rigidly secured at its lower end to the shaft 158 and extending at approximately a right angle to the arms 159. The numeral 163 designates a flexible cable secured at one end to the hand lever 161 and at its other end secured to the free end of the arm 162. By the use of this flexible cable 163 the forward end of the invention may be moved upwardly, but cannot be moved downwardly beyond a predetermined position obtained by the adjustment of the hand lever 161. When it is desired to move the forward end of the invention a considerable distance from the ground, the hand lever 161 is pulled to a complete backward position. The manual lifting of the forward end of the corn picker by the lever 161 is facilitated by the supporting coil spring 21.

The purpose of the three lug chains 58 is to contact leaning and down-stalks of corn that would ordinarily be crowded under the machine by the conformation of the pointed shoes 62 and 63. This is very important, as such stalks of corn that are crowded beneath the machine cannot be attacked and raised to a proper position by the lug chains 53.

By the snapping mechanism of the invention being directly in front of the tractor and the husking mechanism directly back of the tractor, the possibility of breaking down unharvested corn in other rows of the field is eliminated. This fact, with the ability of the machine to pick up down-stalks of corn leaves a picked corn field in relatively excellent condition and suitable for a stock pasture.

By providing the frame base as I have heretofore described, it is a simple matter to attach or detach the invention from the tractor. In fact, it is merely necessary to lower hinged supporting legs 164 secured to the rear end of the invention and then elevate the forward end of the invention to a point where the tractor can be run out from under the same after it has been unfastened from the chassis of the invention. After the tractor has been removed from the device and it is desirable to move the same to another location, the lower portion of the trailer 86 may be used to support the entire invention and facilitate its cartage. By the use of the conveyor 92 and the directly downward feeding of the right elevator housing 66, all cornstalks and such material that accidentally reaches the husking mechanism will be fed endwise onto the husking rolls and as these husking rolls are rotating toward each other, they will pass such stalks between them downwardly to the conveyor 131 and successfully out of the machine.

By the use of the adjustably positioned hand levers 122 the position of the raddle 126 may be adjustably moved and secured at different distances from the husking rolls, thereby making it possible for the operator to adjust the shucking mechanism to compensate for either dry or wet ears of corn, thereby assuring the successful shucking of all ears without unduly shelling the grain therefrom regardless of the moisture condition of the corn.

It will be noted that most of the bevel gears and most of the sprocket gears are of duplicate dimensions, thereby providing a very economically manufactured machine and one that may be easily and cheaply repaired. Also, many other parts of the device are interchangeable one with the other.

When the tank 87 or other receiving means is not for the moment under the outlet end of the conveyor housing 72, I have provided a trap door 165 hinged at its upper portion to the housing 72, as shown in Fig. 6. This trap door may be moved to a closed position where it engages the catch 166 by a cable or like 167. As soon as the open end of the housing 72 is again over a receiving means, the trip cable 168 may be operated and the door 165 will be forced to an open position by the weight of the ears of corn. By securing the spring 21 to the arch 20 with a threaded bolt, as shown in the drawings, the tension of the spring may be adjusted to cause the forward end of the invention to contact the ground or objects with varying force.

Some changes may be made in the construction and arrangement of my improved corn picker and method of attaching the same to a tractor, without departing from the real spirit and purpose of my invention, and it is my intention to cover by my claims any modified forms of structure or use of mechanical equivalents which may be reasonably included within their scope.

I claim:

1. In combination with an automotive vehicle such as a tractor, a frame embracing said vehicle and pivoted at its rear end portion to the rear end portion of said vehicle, an arch designed to be secured to the front portion of said vehicle, a coil spring having one end secured to said arch and its other end secured to the front end portion of said frame for yieldingly supporting the front end portion of said frame, a manually adjustable means operatively connected to said arch and said frame for limiting the downward movement of the forward end of said frame, a pair of rotatably mounted snapping rolls, rigid members for contacting and guiding stalks of corn to said snapping rolls, a husking mechanism supported on said frame, an elevator for conveying snapped ears from said snapping rolls to said husking mechanism, and a means for operatively connecting said snapping rolls, said elevator and said husking mechanism with the motor of said vehicle.

2. In combination with an automotive vehicle such as a tractor, a frame having its rear portion pivoted to the rear portion of said vehicle, an arch designed to be secured to the front portion of said vehicle, a coiled spring having one end secured to said arch and its other end secured to the front end portion of said frame for yieldingly supporting the front end portion of said frame, a shaft rotatably mounted on the front end portion of said frame, an arm having one end rigidly secured to said shaft, a link having one end hingedly secured to the free end of said arm and its other end hingedly secured to said arch, a second arm rigidly secured to said shaft and extending at an angle to said first mentioned arm, an adjustable hand lever secured to said frame, a flexible cable secured to said lever and said last mentioned arm, an ear snapping mechanism on the forward end of said frame, a husking mechanism on the rear end portion of said frame, an elevator extending from said snapping mechanism to said husking mechanism, and a means for operatively connecting said snapping and husking mechanisms with the motor of said vehicle.

3. In combination with an automotive vehicle such as a tractor, a rectangular frame designed to embrace the sides of the tractor, U-members secured to the rear end portion of said frame designed to embrace the tractor axle housing, a coiled spring having one end secured to the forward end of said frame and its other end designed to be secured to said tractor, ear snapping mechanism supported on the forward end portion of said frame, ear shucking mechanism on the rear end portion of said frame, an elevator extending from said ear snapping mechanism to said ear shucking mechanism, foldable legs for supporting the rear end of the frame at times, and a means for operatively connecting said snapping mechanism, shucking mechanism and said elevator with the power take-off of said tractor.

4. In combination with an automotive vehicle such as a tractor, a rectangular frame designed to embrace the sides of the tractor, U-members secured to the rear end portion of said frame designed to embrace the tractor axle housing, a coiled spring having one end secured to the forward end of said frame and its other end designed to be secured to said tractor, ear snapping mechanism supported on the forward end portion of said frame, ear shucking mechanism on the rear end portion of said frame, an elevator extending from said ear snapping mechanism to said ear shucking mechanism, foldable legs for supporting the rear end of the frame at times, a hingedly mounted elevator for transferring the shucked corn from said shucking mechanism to a delivery point, a stop member for limiting the outward movement of said elevator, and a means for operatively connecting said snapping mechanism, shucking mechanism and said elevators to the motor of said tractor.

5. In combination with an automotive vehicle such as a tractor, a frame having its rear portion pivoted to the rear portion of said vehicle, an arch secured to the front portion of said vehicle, a coil spring having one end secured to said arch and its other end secured to the front end portion of said frame for yieldingly supporting the front end portion of said frame, a means operatively secured to said vehicle and said frame for adjustably limiting the downward movement of the front end portion of said frame, a pair of snapping rolls rotatably mounted on said frame, rigid members on said frame for contacting and guiding stalks of corn to said snapping rolls, pivotally mounted pointed shoes secured to each of said guiding members, a rotatably mounted lugged endless chain at each side of said rolls lying in a downwardly sloping longitudinal vertical plane, a rotatably mounted lugged endless chain at each side of said snapping rolls lying in a downwardly sloping plane, perpendicular to the longitudinal vertical planes of the first mentioned endless chains, and a means operatively connecting said snapping rolls and said endless chains to the power take-off of said automotive vehicle.

6. In combination with an automotive vehicle such as a tractor, a frame having its rear portion pivoted to the rear portion of the said vehicle, an arch designed to be secured to the front portion of said vehicle, a single coil spring having one end adjustably secured to said arch and its other end secured to the front end portion of said frame, an ear snapping mechanism on the forward end of said frame, a husking mechanism housing on said frame, a pair of husking rolls rotatably mounted in said housing and lying in a downwardly sloping plane, an elevator for conveying snapped ears from said snapping rolls to the upper portions of said husking rolls, a yieldable adjustable mounted raddle in said housing and above said husking rolls, a chute formed in said housing for receiving the husked ears of corn from said husking rolls, an endless perforated conveyor rotatably mounted in said housing, below said husking rolls and capable of engaging material on the bottom of said housing and forcing the same into said chute, a centrifugal fan rotatably mounted in said housing and between the upper and lower portions of said endless conveyor, a husked corn and grain receiving elevator secured to the bottom portion of said housing, a means for delivering corn from said chute to said last mentioned elevator, and a means for connecting said snapping rolls, said husking rolls, said raddle, said perforated conveyor, said centrifugal fan, said grain receiving elevator and said delivery means to the power take-off of said vehicle.

7. In combination with an automotive vehicle such as a tractor, a frame designed to have its rear portion pivoted to the rear portion of said vehicle, a coil spring having one end secured to the forward end of said frame and its other end designed to be secured to the said vehicle for yieldingly supporting the front end portion of said frame, a pair of snapping rolls rotatably mounted on said frame, rigid members on said frame for contacting stalks of corn to said snapping rolls, pivotally mounted shoes secured to each of said guiding members, a rotatably mounted lugged endless chain at each side of said snapping rolls lying in a downwardly sloping longitudinal vertical plane and extending from an elevated point on said rigid members to a point in and on the pivoted shoe below it, a rotatably mounted lugged endless chain at each side of said snapping rolls lying in a downwardly sloping plane perpendicular to the longitudinal vertical plane of the first-mentioned endless chain, and a means for operatively connecting said snapping rolls and said endless chains to the power take-off of said automotive vehicle.

8. In a device of the class described, a frame, a wheeled means for supporting said frame, a pair of snapping rolls rotatably mounted on said frame, rigid members on said frame for contacting and guiding stalks of corn to said snapping rolls, a pivotally mounted pointed shoe secured on the forward end of each of said rigid members, a sprocket gear rotatably mounted on each of said rigid members, a sprocket gear rotatably mounted on each of said shoes, a rotatably mounted lugged endless chain at each side of said rolls lying in a downwardly sloping longitudinal vertical plane; each of said chains embracing a sprocket gear on one of the shoes and a sprocket gear on one of the rigid members and cutting a path that extends forwardly and downwardly to a point in close proximity to the forward end of the pointed shoe to which they are secured, a rotatably mounted lugged endless chain at each side of said snapping rolls lying in a downwardly sloping plane perpendicular to the longitudinal vertical plane of the first-mentioned endless chain, and a means for actuating said snapping rolls and said endless chains.

GEORGE R. BINAU.